(12) United States Patent
Mori et al.

(10) Patent No.: US 10,481,732 B2
(45) Date of Patent: Nov. 19, 2019

(54) PRESS DETECTING TOUCH PANEL AND DISPLAY DEVICE

(71) Applicant: Murata Manufacturing Co., Ltd., Nagaokakyo-shi, Kyoto-fu (JP)

(72) Inventors: Kenichi Mori, Nagaokakyo (JP); Masamichi Ando, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 18 days.

(21) Appl. No.: 15/438,965

(22) Filed: Feb. 22, 2017

(65) Prior Publication Data

US 2017/0160872 A1 Jun. 8, 2017

Related U.S. Application Data

(63) Continuation of application No. PCT/JP2015/073076, filed on Aug. 18, 2015.

(30) Foreign Application Priority Data

Sep. 4, 2014 (JP) .................................. 2014-179834

(51) Int. Cl.
*G06F 3/045* (2006.01)
*G06F 3/041* (2006.01)
*G06F 3/044* (2006.01)

(52) U.S. Cl.
CPC ............ *G06F 3/0418* (2013.01); *G06F 3/044* (2013.01); *G06F 2203/04105* (2013.01)

(58) Field of Classification Search
CPC ......... G06F 3/0416; G06F 3/044; G06F 3/041
See application file for complete search history.

(56) References Cited

U.S. PATENT DOCUMENTS

| | | | |
|---|---|---|---|
| 9,128,553 B2 | 9/2015 | Andoh | |
| 9,134,826 B2 | 9/2015 | Andoh | |
| 9,323,388 B2 | 4/2016 | Yumoto et al. | |
| 9,383,884 B2 | 7/2016 | Ando | |
| 2008/0211779 A1* | 9/2008 | Pryor ................. | G01C 21/3664 345/173 |
| 2009/0002199 A1* | 1/2009 | Lainonen .............. | G06F 3/0414 341/20 |

(Continued)

FOREIGN PATENT DOCUMENTS

| | | |
|---|---|---|
| JP | H05-61592 A | 3/1993 |
| JP | 2012-203552 A | 10/2012 |

(Continued)

OTHER PUBLICATIONS

International Search Report issued in International Application No. PCT/JP2015/073076, dated Nov. 10, 2015.

(Continued)

*Primary Examiner* — Nan-Ying Yang
(74) *Attorney, Agent, or Firm* — Arent Fox LLP

(57) ABSTRACT

A press detecting touch panel that includes a housing defining an opening, a piezoelectric film, and a holding member which holds the piezoelectric film within the opening. An entire periphery of the holding member is fixed to the housing such that the holding member covers the opening, and a first cross sectional shape along a first direction of the holding member is different than a second cross sectional shape along a second direction of the holding member.

10 Claims, 9 Drawing Sheets

(56) References Cited

U.S. PATENT DOCUMENTS

| | | |
|---|---|---|
| 2011/0109204 A1* | 5/2011 | Tajitsu .................. H01L 41/193 310/348 |
| 2012/0075226 A1 | 3/2012 | Andoh |
| 2013/0328817 A1 | 12/2013 | Andoh |
| 2014/0049137 A1 | 2/2014 | Ando et al. |
| 2015/0116232 A1* | 4/2015 | Hayakawa ............ G06F 3/0412 345/173 |
| 2015/0122625 A1* | 5/2015 | Seo ........................ G06F 3/044 200/5 R |
| 2015/0153880 A1 | 6/2015 | Ando |
| 2015/0229745 A1* | 8/2015 | De Wind ............ H04M 1/0266 455/575.8 |
| 2015/0242048 A1 | 8/2015 | Yumoto et al. |
| 2016/0034073 A1 | 2/2016 | Andoh |

FOREIGN PATENT DOCUMENTS

| | | |
|---|---|---|
| WO | WO 2010/143528 A1 | 12/2010 |
| WO | WO 2012/137897 A1 | 10/2012 |
| WO | WO 2014/010594 A1 | 1/2014 |

OTHER PUBLICATIONS

Written Opinion of the International Searching Authority issued in International Application No. PCT/JP2015/073076, dated Nov. 10, 2015.

* cited by examiner

PRESS DETECTING TOUCH PANEL AND DISPLAY DEVICE

CROSS REFERENCE TO RELATED APPLICATIONS

The present application is a continuation of International application No. PCT/JP2015/073076, filed Aug. 18, 2015, which claims priority to Japanese Patent Application No. 2014-179834, filed Sep. 4, 2014, the entire contents of each of which are incorporated herein by reference.

FIELD OF THE INVENTION

The present invention relates to a press detecting touch panel which detects a press on an operation surface.

BACKGROUND OF THE INVENTION

There is, for example, a touch input device disclosed in Patent Document 1 as a pressing sensor which detects a press on an operation surface. The touch input device described in Patent Document 1 adopts a structure formed by overlaying a pressure-sensitive sensor of a flat shape and a capacitive sensor of a flat shape.

Further, for example, an input device disclosed in Patent Document 2 is also known. The input device disclosed in Patent Document 2 includes an operation surface of a rectangular flat shape. A piezoelectric element is provided in a lower surface of the operation surface. When a user presses the operation surface, the operation surface warps and the piezoelectric element warps, so that it is possible to detect the press.

Patent Document 1: Japanese Patent Application Laid-Open No. 5-61592
Patent Document 2: Japanese Patent Application Laid-Open No. 2012-203552

SUMMARY OF THE INVENTION

However, when an entire periphery of an operation surface is fixed to a housing, potentials produced in a piezoelectric element reverse in response to a warp of the operation surface depending on a pressing position, and an output decreases or reverses in some cases.

When, for example, a shape of an operation surface seen from a plan view is a square shape, and a stretching direction of polylactic acid uniaxially stretched as a piezoelectric element is disposed along a diagonal line of the square shape, when a center position of the square shape is pressed, the same potential (positive potential) is produced near two facing sides seen from the plan view. However, reverse potentials (negative potentials) of the same level are produced near the other two sides. In this case, the positive potentials and the negative potentials cancel each other, and an output becomes zero.

It is therefore an object of the present invention to provide a press detecting touch panel which prevents a reverse potential from being produced, and prevents a decrease in an output or inversion of the output.

A pressing touch panel according to the present invention includes a housing defining an opening, a piezoelectric film and a holding member which holds the piezoelectric film within the opening. Further, an entire periphery of the holding member is fixed to the housing such that the holding member can warp in a normal direction, and a shape of a horizontal cross section and a shape of a vertical cross section of the holding member are different.

Thus, when the shape of the horizontal cross section and the shape of the vertical cross section of the holding member are different, the warp amount of the holding member along a vertical direction and a warp amount along the horizontal direction are different. Thus, even when, for example, a shape of the holding member seen from a plan view is a square shape, and a stretching direction of polylactic acid uniaxially stretched as the piezoelectric film is disposed along a diagonal line of the square shape, absolute values of potentials differ between near two sides at which positive potentials are produced and near two sides at which negative potentials are produced. Consequently, it is possible to prevent a reverse potential from being produced and prevents a decrease in an output or inversion of the output.

An example where the shape of the horizontal cross section and the shape of the vertical cross section of the holding member are different can be implemented where the thickness is not uniform. Particularly when the thickness changes along at least one direction (e.g. vertical direction) in a principal surface of the holding member, a warp near the two sides at an end in the horizontal direction becomes little, so that it is possible to further suppress negative potentials.

Further, the holding member can include a plurality of laminated members where each member has a different aspect ratio when seen from a plan view.

Furthermore, preferably, a touch surface side of the holding member has a protrusion shape and has a flat shape at a housing side to make it easy to fix the holding member to the housing.

In this regard, an example where the shape seen from the plan view is the square shape has been described above. However, in case of, for example, a rectangular shape, even when a center position is pressed, an entire output does not become zero even though there are portions at which reverse potentials are produced. Consequently, a rectangular shape also provides an effect of suppressing a decrease in an output by using the holding member whose thickness is not uniform or using the holding member which is formed by laminating members of different aspect ratios. Further, even when the shape seen from the plan view is a circular shape, the same problem occurs.

In addition, the piezoelectric film is preferably made of a chiral polymer so that it is possible to realize a highly transparent piezoelectric sensor. Further, the chiral polymer is preferably polylactic acid. The polylactic acid produces the piezoelectricity during processing of orienting molecules by way of stretching or the like, and does not need to be subjected to poling processing unlike other polymers such as PVDF or a piezoelectric ceramics. Further, the polylactic acid does not have pyroelectricity, so that it is possible to dispose the piezoelectric sensor near the touch surface.

According to the present invention, it is possible to prevent a reverse potential from being produced and prevent a decrease in an output or inversion of the output.

DETAILED DESCRIPTION OF THE INVENTION

Figure 1A:
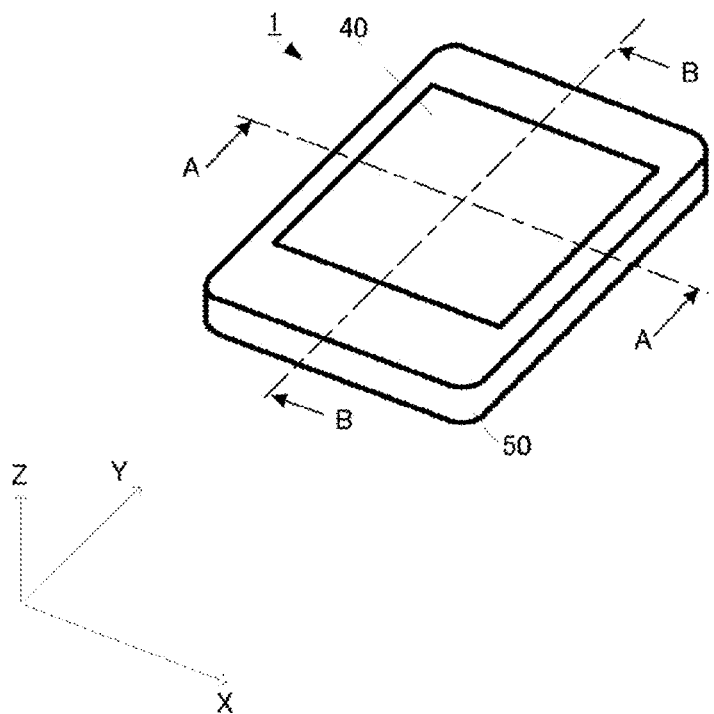
FIG. 1(A) is an external appearance perspective view of a press detecting touch panel.
Figure 1B:
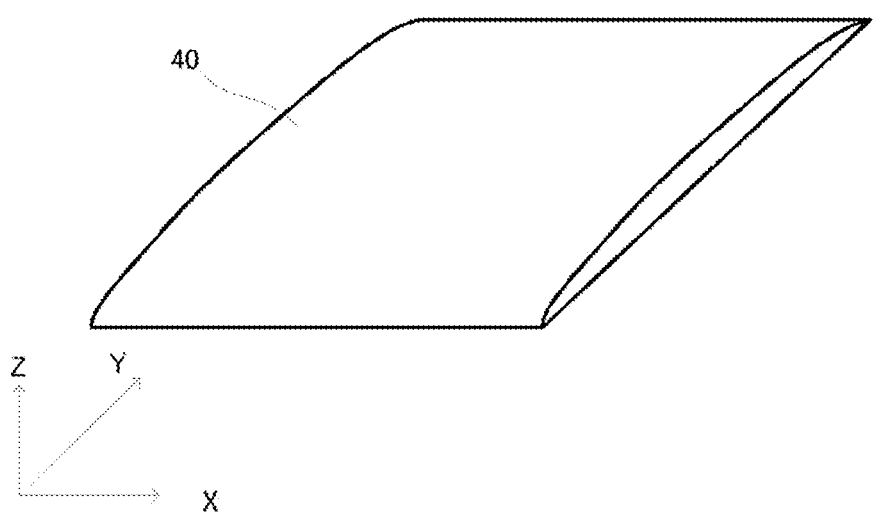
FIG. 1(B) is a perspective view of a panel.
Figure 2A:
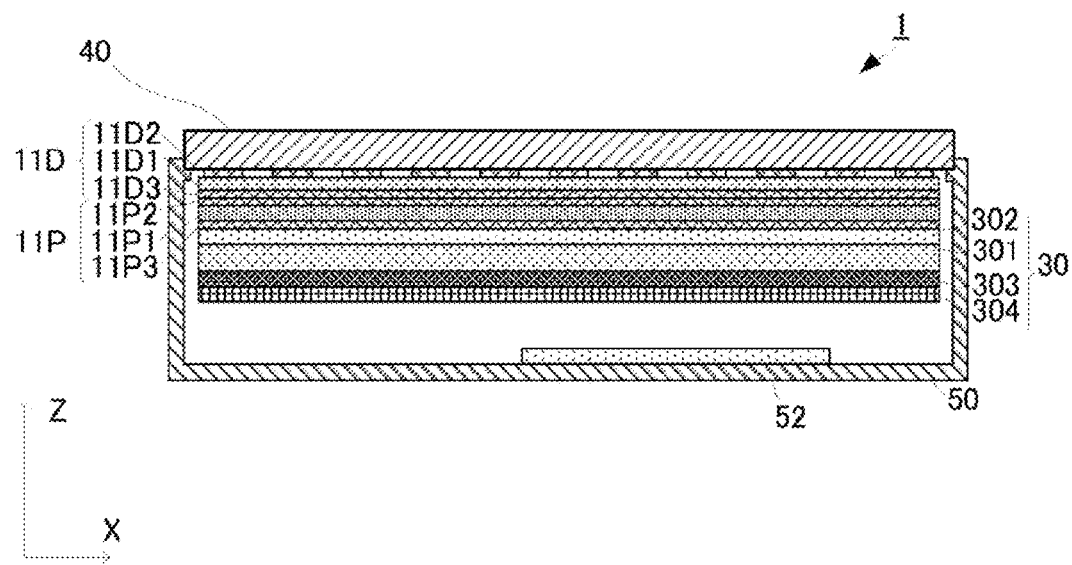
FIGS. 2(A)-2(B) are sectional views of the press detecting touch panel.

FIG. 1(A) is an external appearance perspective view of a press detecting touch panel according to the present invention. FIG. 1(B) is a perspective illustrating a structure of a panel 40. FIG. 2(A) is an A-A sectional view, and FIG. 2(B) is a B-B sectional view.

As illustrated in the external appearance perspective view in FIG. 1(A), a press detecting touch panel 1 includes a thin housing 50 of a cuboid shape and the panel 40 of a planar shape which is disposed in an opening in an upper surface of the housing 50 from a viewpoint of external appearance. The panel 40 corresponds to a holding member according to the present description, and functions as a touch surface on which a user performs a touching operation by using a finger or a pen. The panel 40 is formed by using a flat plate made of, for example, glass, polyethylene terephthalate (PET), polycarbonate (PC) and acryl.

In addition, in the present embodiment, a width direction (horizontal direction) of the housing 50 is an X direction, a length direction (vertical direction) is a Y direction and a thickness direction is a Z direction. Further, in the present embodiment, the thickness of each component is exaggerated for ease of illustration.

Figure 2B:
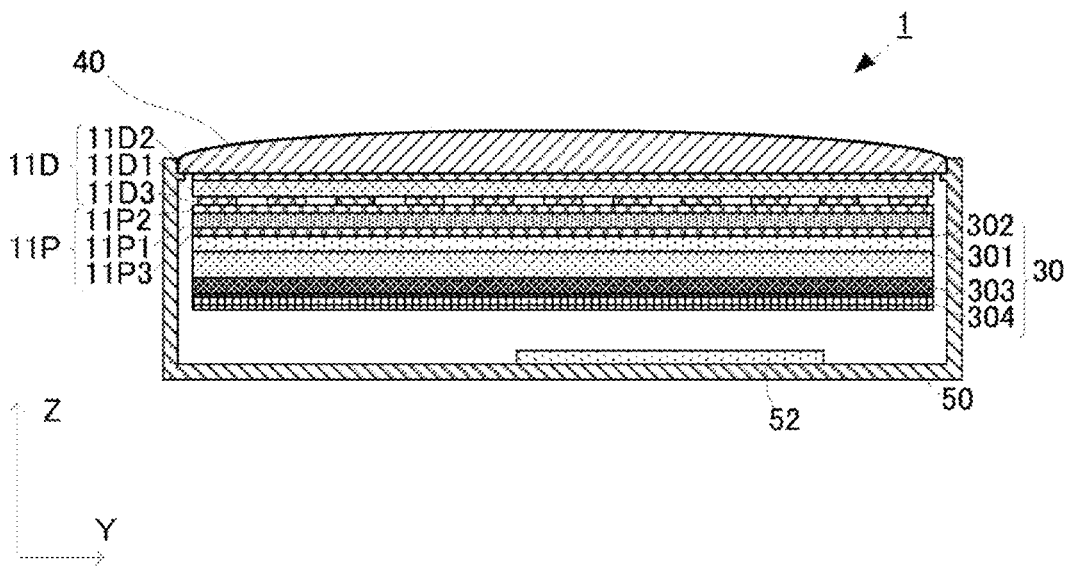

As illustrated in FIGS. 2(A)-2(B), a capacitive sensor 11D, a pressing sensor 11P, a display unit 30 and a control circuit module 52 are disposed along the Z direction in order from a side of the opening (panel 40) inside the housing 50.

A base on which the panel 40 is set is provided to an outer circumference of the opening of the housing 50. The panel 40 is set on this base, and an entire periphery is fixed to the housing 50 by a double-sided tape.

The capacitive sensor 11D, the pressing sensor 11P and the display unit 30 have flat shapes, and are disposed inside the housing 50 and in parallel to the opening (a lower surface of the panel 40) of the housing 50.

The capacitive sensor 11D is pasted on the lower surface of the panel 40 with an adhesive interposed therebetween. The pressing sensor 11P is pasted on the lower surface of the capacitive sensor 11D with an adhesive interposed therebetween. Further, the display unit 30 is pasted on a lower surface of the pressing sensor 11P with the adhesive interposed therebetween. In this regard, an example where the display unit 30 is pasted on the lower surface of the pressing sensor 11P has been described with reference to FIGS. 2(A)-2(B). However, the pressing sensor 11P may be pasted on a lower surface of the display unit 30.

A circuit board (not illustrated) is disposed between a bottom surface of the housing 50 and the display unit 30, and the control circuit module 52 is mounted on the circuit board. The control circuit module 52 is a module which processes detection values of various sensors. For example, the control circuit module 52 performs control to cause the display unit 30 to display images, and determines operation input contents in response to a touching operation received via the capacitive sensor 11D and the pressing sensor 11P.

The display unit 30 is, for example, a liquid crystal display element. In this example, the display unit 30 includes a liquid crystal panel 301, a top surface polarizing plate 302, a back surface polarizing plate 303 and a backlight 304.

The top surface polarizing plate 302 and the back surface polarizing plate 303 are disposed sandwiching the liquid crystal panel 301. The backlight 304 is disposed on a side opposite to the liquid crystal panel 301 with the back surface polarizing plate 303 interposed therebetween.

Light output from the backlight 304 is polarized by the back surface polarizing plate 303, passes through the liquid crystal panel 301 and reaches the top surface polarizing plate 302. The liquid crystal panel 301 changes a polarization state per pixel under control of the control circuit module 52, and changes the amount of light passing through the top surface polarizing plate 302. The light output from the top surface polarizing plate 302 is supplied to the panel 40 via the pressing sensor 11P and the capacitive sensor 11D. Thus, the panel 40 displays various images.

The capacitive sensor 11D includes capacitance detection electrodes 11D2 at an upper surface side and capacitance detection electrodes 11D3 at a lower surface side with an insulation substrate 11D1 of a flat shape interposed therebetween. The insulation substrate 11D1 is made of a material having transparency, and is formed by, for example, PMMA (acrylic resin) or a PET film.

Figure 3A:
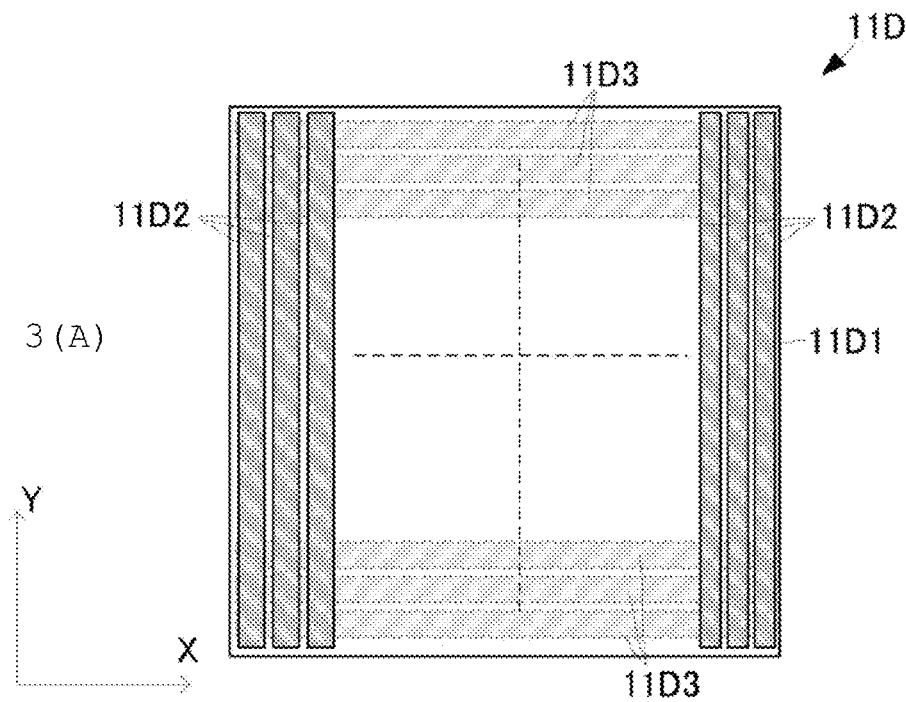
FIGS. 3(A)-3(B) are plan views of the press detecting touch panel.

A plurality of capacitance detection electrodes 11D2 are formed on one principal surface of the insulation substrate 11D1. As illustrated in, for example, FIG. 3(A), the plurality of capacitance detection electrodes 11D2 have a rectangular shape which is long in one direction when seen from a plan view, and are disposed such that a longitudinal direction is parallel to the Y direction. The plurality of these capacitance detection electrodes 11D2 are disposed at predetermined intervals along the X direction.

Further, a plurality of capacitance detection electrodes 11D3 are formed on the other principal surface of the insulation substrate 11D1. As illustrated in, for example, FIG. 3(A), the plurality of capacitance detection electrodes 11D3 also have a rectangular shape which is long in one direction when seen from the plan view. The plurality of capacitance detection electrodes 11D3 are disposed such that the longitudinal direction is parallel to the X direction. The plurality of capacitance detection electrodes 11D3 are disposed at predetermined intervals along the Y direction.

All of the plurality of capacitance detection electrodes 11D2 and the plurality of capacitance detection electrodes 11D3 are made of materials having transparency, and the materials whose main components are indium tin oxide (ITO), zinc oxide (ZnO) and polythiophene are preferably used.

A capacitance of the capacitive sensor 11D changes according to whether or not a touching operation is performed on the panel 40, which is the touch surface. A combination of the capacitance detection electrode 11D2 and the capacitance detection electrode 11D3 which have detected a change in the capacitance detects a position of the touching operation.

Figure 3B:
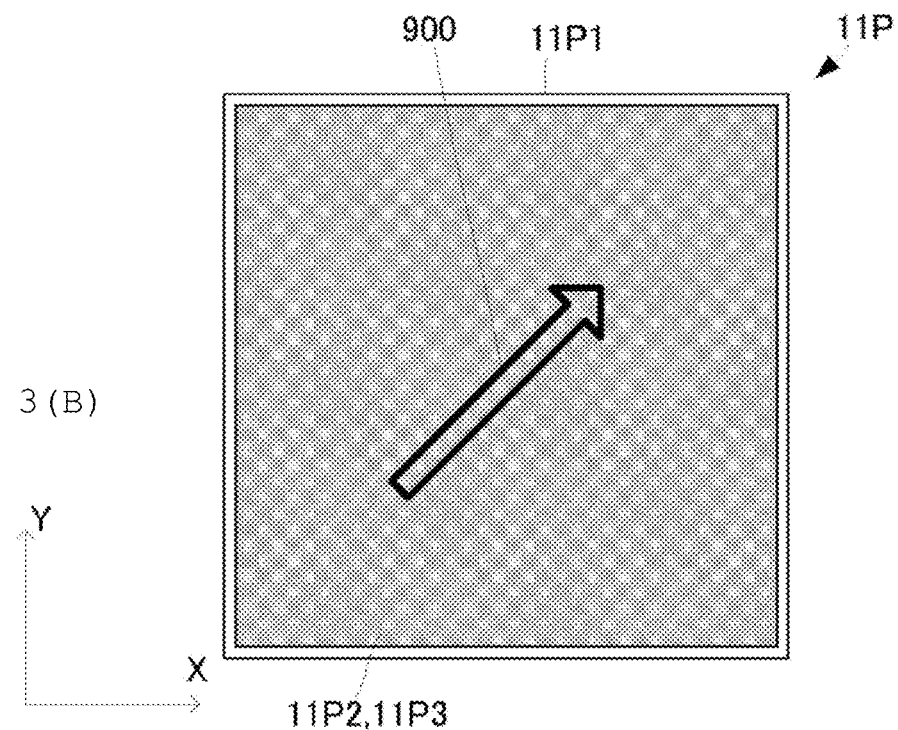

The pressing sensor 11P includes a piezoelectric film 11P1 of a flat film shape. Press detection electrodes 11P2 are formed on one principal surface of the piezoelectric film 11P1, and press detection electrodes 11P3 are formed on the other principal surface. As illustrated in FIG. 3(B), the press detection electrodes 11P2 and the press detection electrodes 11P3 are formed on a nearly entire principal surface of the piezoelectric film 11P1.

All of the press detection electrodes 11P2 and the press detection electrodes 11P3 are made of materials having transparency, and the materials whose main components are indium tin oxide (ITO), zinc oxide (ZnO) and polythiophene are preferably used. In this regard, when the pressing sensor 11P is pasted on the lower surface of the display unit 30, a highly conductive material such as aluminum or copper is preferably used.

The press detection electrodes 11P2 and the press detection electrodes 11P3 may be directly formed on both principal surfaces of the piezoelectric film 11P1, or may adopt a structure formed by pasting electrodes formed on PET or COP by an adhesive. Further, an example where capacitance detection electrodes and press detection electrodes are separated and formed in different layers has been described. However, the capacitance detection electrodes 11D3 and the press detection electrodes 11P2 may be combined and used and may be disposed in the same layer to realize a touch panel of a composite electrode structure. In this case, the plurality of divided press detection electrodes 11P2 are disposed between the plurality of capacitance detection electrodes 11D3. In this regard, a plurality of divided press detection electrodes can also detect signals independently from the respective electrodes. In this case, the plurality of press detection electrodes are preferably disposed such that the longitudinal direction is the same as a direction (the Y direction in this example) in which the thickness of the panel 40 changes. When there are electrodes which produce reverse potentials (e.g. press detection electrodes formed at both ends in an X axis direction), it is possible to increase an output level by, for example, using only a signal of the press detection electrode near a center in the X axis direction or reversing the polarities of signals of the press detection electrodes at the both ends without using signals of the press detection electrodes formed at the both ends in the X axis direction.

According to such a structure, the piezoelectric film 11P1 warps in a normal direction when the operator presses the panel 40 by using an object such as a finger or a pen, and produces charges. The produced charges are detected by the press detection electrodes 11P2 and the press detection electrodes 11P3.

A chiral polymer is preferably used for the piezoelectric film 11P1. The chiral polymer has high transparency, and is suitably used together with the display unit 30. Further, the chiral polymer is more preferably uniaxially stretched polylactic acid (PLA) and is still more preferably poly-L-lactide (PLLA). In this regard, the chiral polymer may also be poly-γ-methyl-L-glutamate, cellulose or collagen.

The main chain of the chiral polymer adopts a helical structure, and has piezoelectricity when the chiral polymer is uniaxially stretched and molecules are oriented. The chiral polymer produces the piezoelectricity during processing of orienting molecules by way of stretching or the like, and does not need to be subjected to poling processing unlike other polymers such as PVDF or a piezoelectric ceramics. Particularly, the polylactic acid does not have pyroelectricity, and therefore even when a pressing sensor is disposed near the touch surface and heat of the user's finger transmits to the pressing sensor, a charge amount to be detected does not change. Further, a piezoelectric constant of the uniaxially stretched PLLA is very high among polymers. Furthermore, the PLLA does not show a temporal fluctuation of a piezoelectric constant, and is very stable.

In the present embodiment, as illustrated in FIG. 3(B), the piezoelectric film 11P1 is disposed such that a uniaxial stretching direction 900 forms an angle of approximately 45° with respect to the X direction and the Y direction. The piezoelectric film 11P1 is disposed in this way and therefore produces charges when warped in the normal direction.

In this regard, as illustrated in FIGS. 1(B), 2(A) and 2(B), a cross sectional shape of the panel 40 according to the present embodiment seen from a side surface side (X direction) is elevated in an arc shape toward the touch surface (protrudes toward the touch surface side). Thus, the press detecting touch panel 1 according to the present embodiment breaks a balance between a warp amount in the vertical direction and a warp amount in the horizontal direction caused by a press on the touch surface, and prevents charges from canceling each other.

Figure 4A:
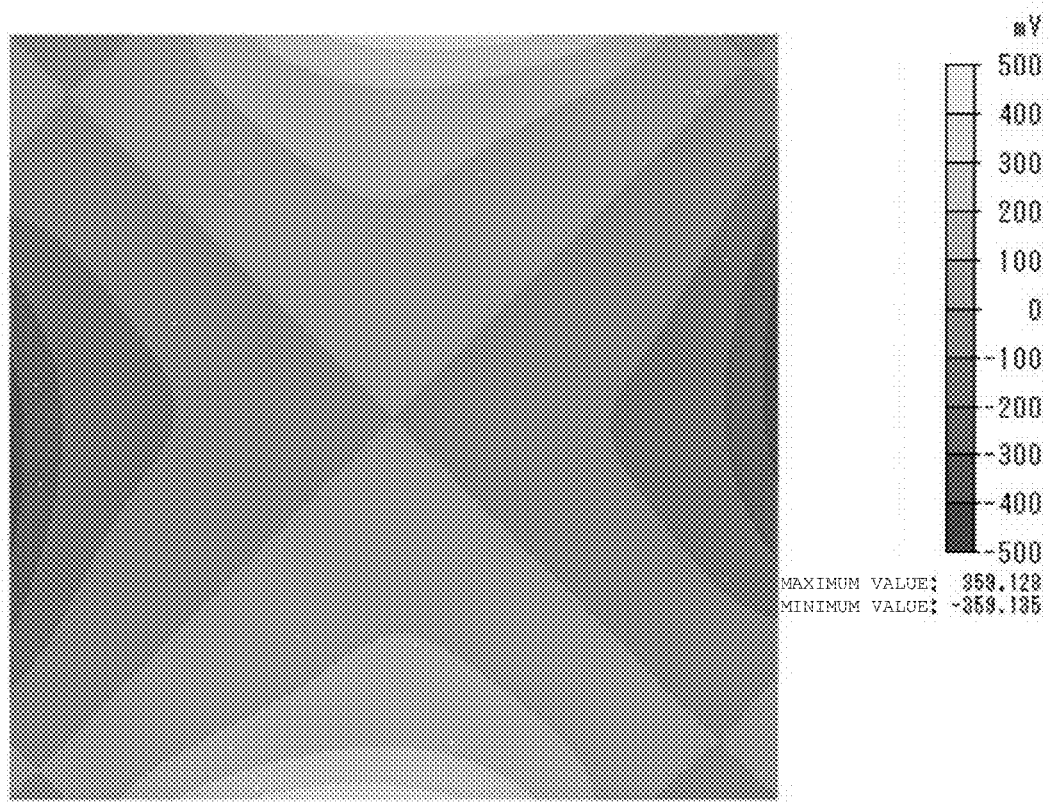
FIGS. 4(A)-4(B) are views illustrating a calculation result of a potential distribution produced in a conventional panel.
Figure 4B:
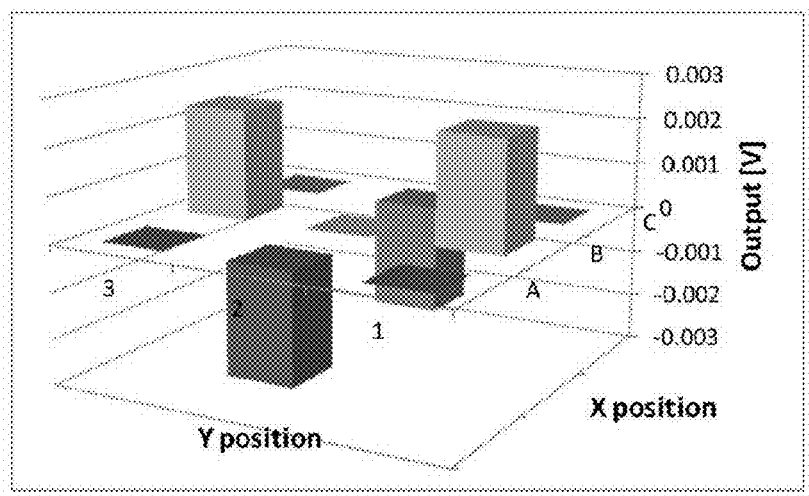
Figure 5:
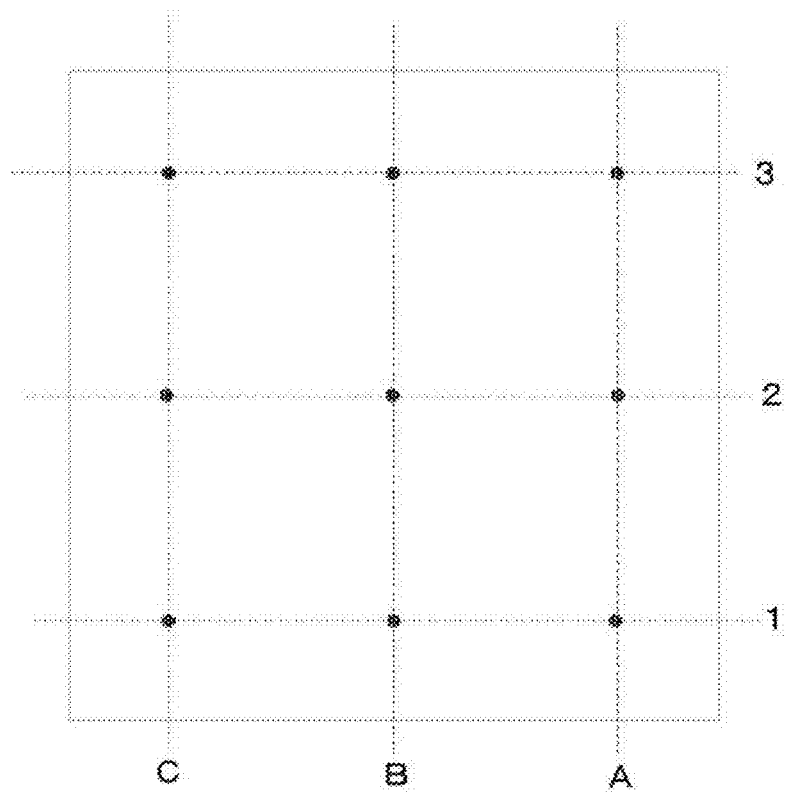
FIG. 5 is a view illustrating a pressing position.

FIG. 4(A) is a view illustrating a result obtained by simulating a potential distribution produced when a pressing force is applied to a center of a panel having uniform thickness by a finite element method. In this regard, according to the finite element method simulation, calculation is performed without forming electrodes, and potentials on a substance surface are calculated according to a piezoelectric equation or the like. A potential of each calculation element can be associated with an electric field on the ground of internal polarization, and therefore this potential distribution substantially matches with a charge distribution. FIG. 4(B) illustrates calculation results of voltages when positions of nine points (1A, 1B, 1C, 2A, 2B, 2C, 3A, 3B, and 3C) illustrated in FIG. 5 are pressed.

As described above, the piezoelectric film 11P1 is disposed such that the uniaxial stretching direction 900 forms the angle of approximately 45° with respect to the X direction and the Y direction. Therefore, when a center position of a panel of a square shape is pressed, a potential is not produced on a diagonal line which matches with (or is orthogonal to) a stretching direction. Further, the piezoelectric film 11P1 produces the same potential (positive potential) near two facing sides (edge sides in the vertical direction) when seen from the plan view, and a reverse potential (negative potential) of the same level is produced near the other two sides (edge sides in the horizontal direction). Hence, when the diagonal line including the center position is pressed as illustrated in FIG. 4(B), a positive potential and a negative potential cancel each other, and an output becomes zero. Further, when, for example, a proximity of the edge side in the horizontal direction is pressed, a warp near the edge side in the horizontal direction is greater than a warp near the edge side in the vertical direction, so that negative potentials become greater than positive potentials and an output is inverted.

Figure 6A:
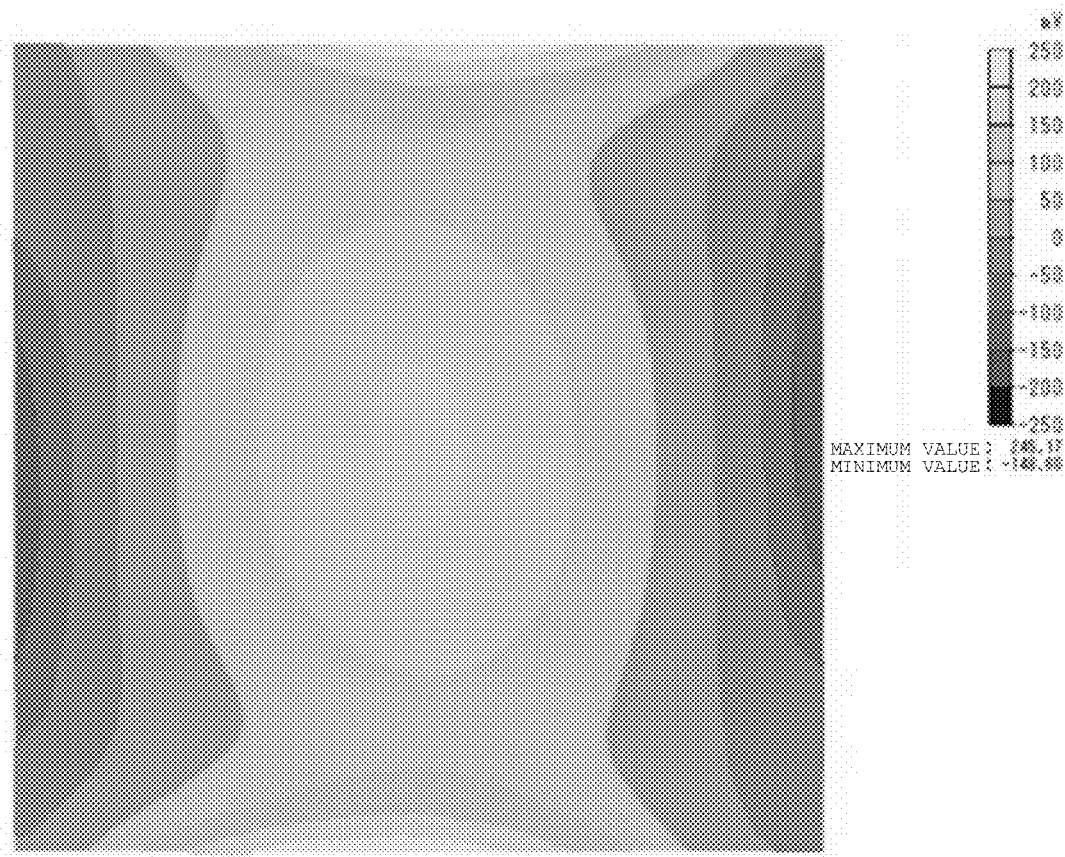
FIGS. 6(A)-6(B) are views illustrating a calculation result of a potential distribution produced in a panel according to the present embodiment.
Figure 6B:
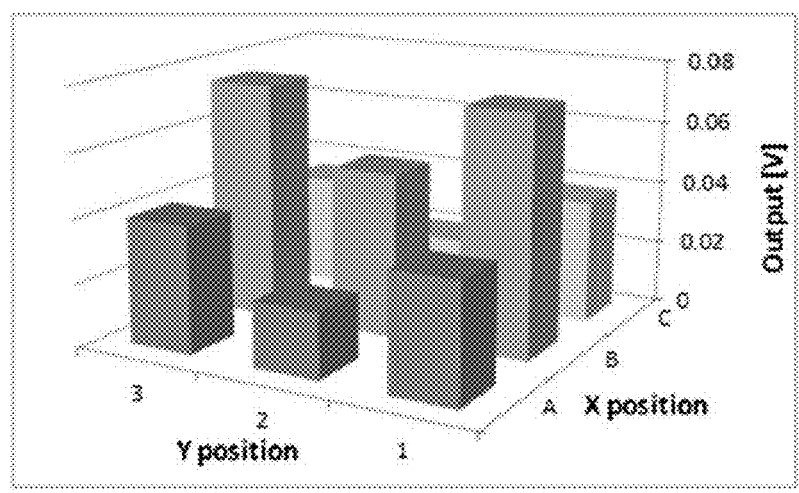

Meanwhile, FIG. 6(A) is a view illustrating a result obtained by simulating a potential distribution produced when a pressing force is applied to the center of the panel 40 according to the present embodiment by a finite element method. FIG. 6(B) illustrates calculation results of voltages when positions of nine points (1A, 1B, 1C, 2A, 2B, 2C, 3A, 3B, and 3C) illustrated in FIG. 5 are pressed.

As illustrated in FIG. 6(A), the panel 40 according to the present embodiment has a shape whose thickness changes along the Y direction, and therefore a warp near the edge side in the horizontal direction is less than a warp near an edge side in the vertical direction. That is, even when a center position is pressed, absolute values of potentials differ between near the edge side in the vertical direction at which positive potentials are produced and near the edge side in the horizontal direction at which negative potentials are produced, an area in which positive potentials are produced increases and an area in which negative potentials are produced decreases. Hence, as illustrated in FIG. 6(B), even when a diagonal line including the center position is pressed, the positive potentials and the negative potentials do not cancel each other, so that the panel 40 detects the positive potentials at all times. Further, even when, for example, a proximity of the edge side in the horizontal direction is pressed, a warp near the edge side in the horizontal direction is less than a warp near the edge side in the vertical direction, so that positive potentials are detected at all times.

Hence, a shape whose thickness changes along the vertical direction and does not change along the horizontal direction similar to the panel 40 according to the present embodiment makes it possible to detect a pressing operation and a pressing amount irrespectively of a pressing position.

In this regard, the panel 40 according to the present embodiment has a square shape when seen from the plan view, yet is not limited to the square shape and may have, for example, a nearly rectangular shape whose corners are chamfered. In this regard, the panel 40 adopts the structure which is elevated in an arc shape toward the touch surface (which protrudes toward the touch surface side), yet the lower surface side may have a protrusion shape and the touch surface side may have a flat shape. However, the touch surface side has the protrusion shape, and the flat surface is disposed at the side of the housing 50, so that it is easy to fix the panel 40 to the housing. Further, the panel 40 is elevated in the arc shape a little (e.g. while vertical and horizontal lengths are 100 mm, a height of the elevation is approximately 1 mm), and therefore even when the touch surface side has the protrusion shape, the panel 40 seems to be flat from a viewpoint of the external appearance.

Figure 9A:
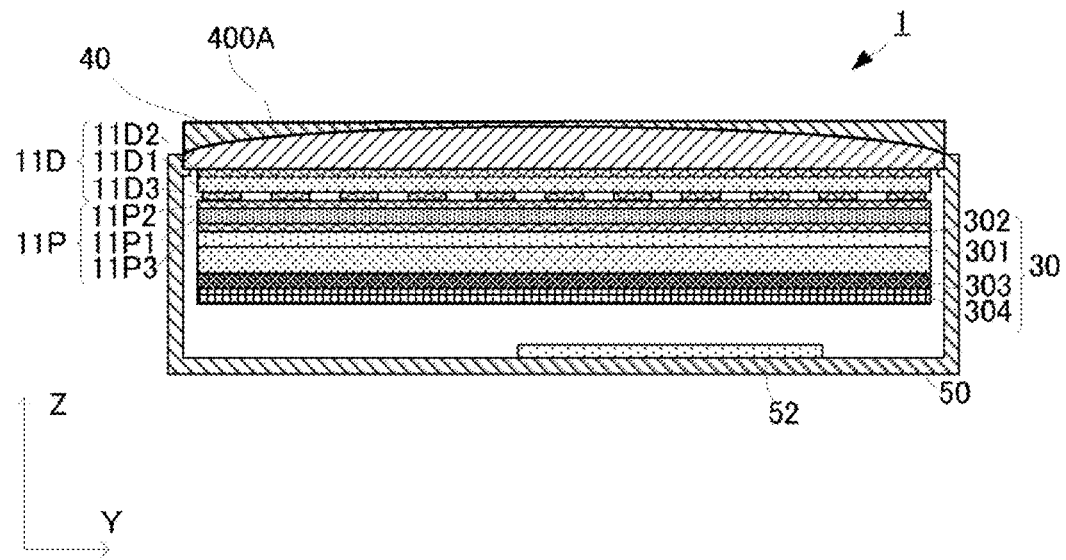
FIGS. 9(A)-9(B) are sectional views of a press detecting touch panel.

In this regard, by disposing a second panel 400A whose lower surface has a recessed shape as illustrated in FIG. 9(A), it is possible to planarize an upper surface compared to the above example.

The second panel 400A has a modulus different from a modulus of the panel 40, and has an upper surface of a flat shape and a lower surface of a recessed shape. The recessed shape of the lower surface of the second panel 400A is fitted to a projection shape of the panel 40.

Figure 9B:
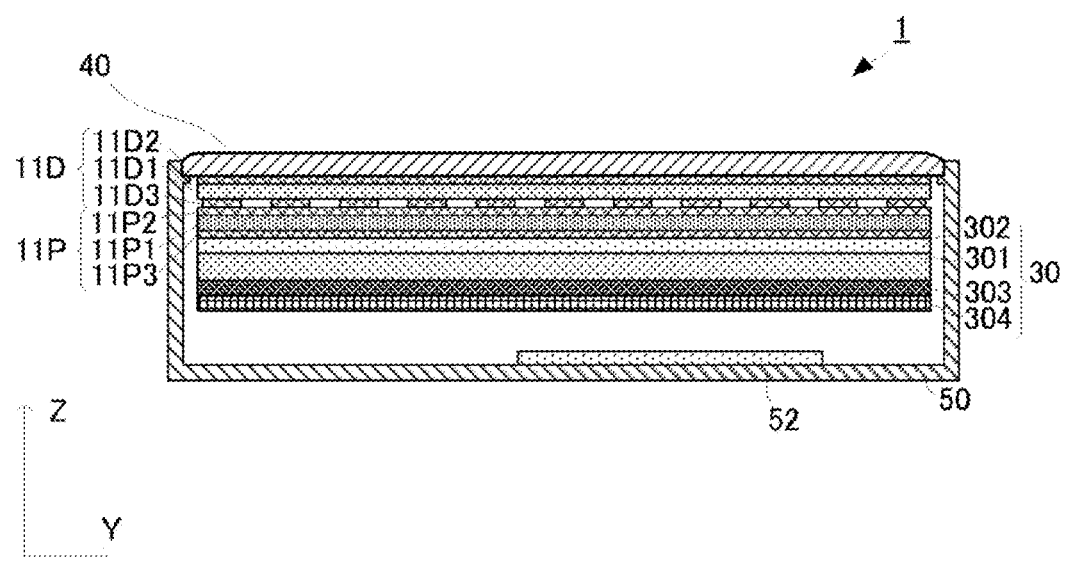

Further, the upper surface of the second panel 400A may not be completely flat and may have a shallower protrusion shape than the upper surface of the panel 40. Furthermore, a flat surface of a second holding member may be disposed facing electrodes. Still further, the panel 40 is not limited to an aspect where an entire upper surface has a curvature, and the thickness may change such that only edge sides may have curvatures as illustrated in, for example, FIG. 9(B).

Figure 7A:
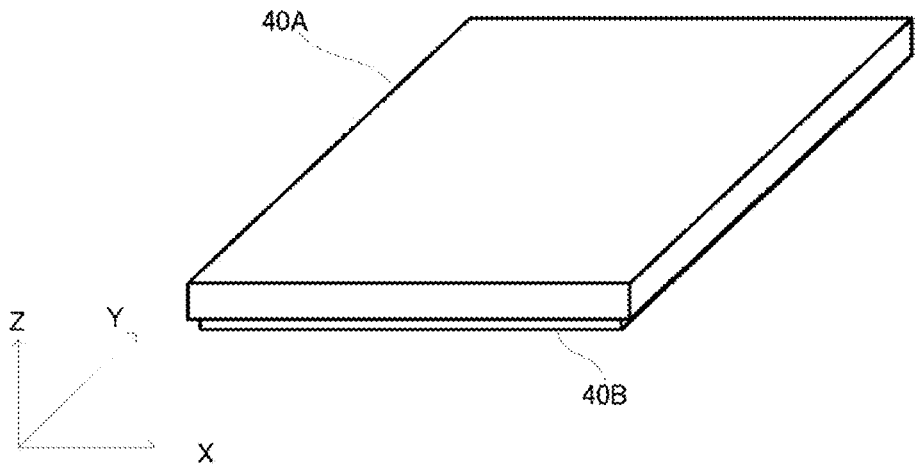
FIGS. 7(A) to 7(C) are views illustrating a structure of a press detecting touch panel according to modified example 1.
Figure 7B:
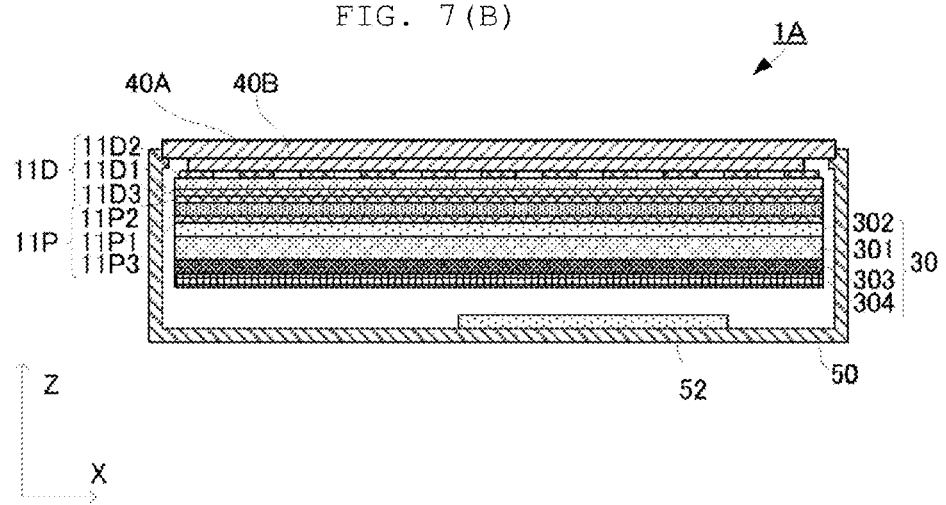
Figure 7C:
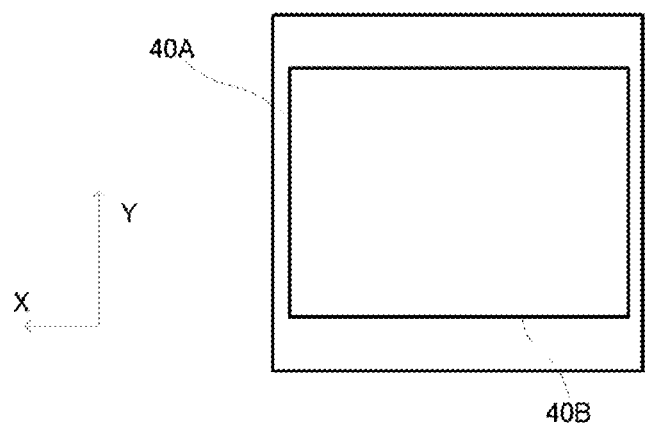

Next, FIGS. 7(A) to 7(C) are views illustrating a structure of a press detecting touch panel according to modified example 1. The components common to those of a press detecting touch panel 1 will be assigned the same reference numerals, and will not be described. FIG. 7(A) is a perspective view of a panel 40A and a panel 40B, FIG. 7(B) is a sectional view (horizontal sectional view) of a press detecting touch panel 1A, and FIG. 7(C) is a view illustrating the panel 40A and the panel 40B seen from a lower surface side.

The press detecting touch panel 1A according to modified example 1 includes the panel 40A and the panel 40B having the uniform thicknesses instead of a panel 40. The panel 40 is set on a base of a housing 50, and an entire periphery is fixed to the housing 50 by a double-sided tape.

The panel 40B is pasted on a lower surface of the panel 40A with an adhesive interposed therebetween. The panel 40B has a smaller area than panel 40A when seen from the plan view, and has a shorter length in a Y direction (vertical direction). That is, the panel 40A and the panel 40B have different aspect ratios.

In this example, the panel 40B is not provided near an edge side in the vertical direction, and both of the panel 40A and the panel 40B are provided near edge sides in a horizontal direction. Consequently, a warp near the edge side in the horizontal direction is less than a warp near the edge side in the vertical direction. That is, in this example, too, even when a center position is pressed, absolute values of potentials differ between near the edge side in the vertical direction at which positive potentials are produced and near the edge side in the horizontal direction at which negative potentials are produced, an area in which positive potentials are produced increases and an area in which negative potentials are produced decreases.

Hence, similar to the press detecting touch panel 1, the press detecting touch panel 1A can detect a pressing operation and a pressing amount irrespectively of a pressing position. A process of pasting the two panels as illustrated in FIGS. 7(A) to 7(C) is an easy manufacturing process compared to a shape of the panel 40 illustrated in FIG. 1(B). Meanwhile, the shape of the panel 40 illustrated in FIG. 1(B) can provide a better output sensitivity than the shape formed by pasting the panel 40A and the panel 40B since the panel thickness continuously changes.

In this regard, the shape formed by laminating the two panels of the different aspect ratios has been described. However, even when panels of the same shape are laminated, when the panels are pasted displaced relative to each other when seen from the plan view, a warp amount along the horizontal direction and a warp amount along the vertical direction can differ. Consequently, it is possible to detect a pressing operation and a pressing amount irrespective of a pressing position. Further, also in a case where the panel 40B is pasted on an upper surface of the panel 40A, the warp amount along the horizontal direction and the warp amount along the vertical direction can differ. Consequently, it is possible to detect a pressing operation and a pressing amount irrespective of a pressing position. That is, all panels whose shapes of a horizontal cross section and vertical cross section are different are within a technical scope of the present invention.

Figure 8A:
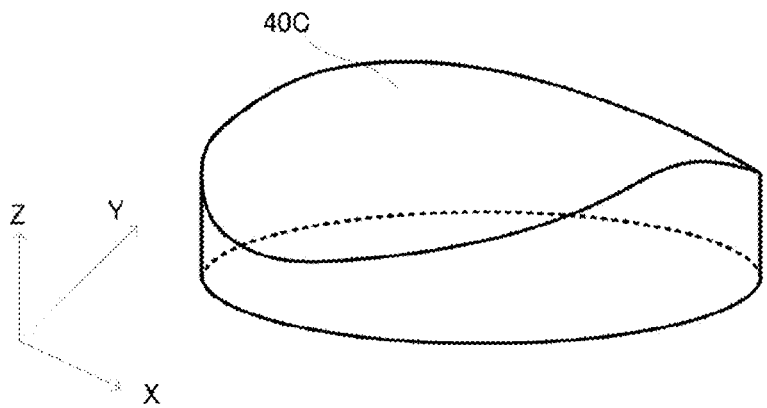
FIGS. 8(A) to 8(C) are views illustrating a structure of a press detecting touch panel according to modified example 2.
Figure 8B:
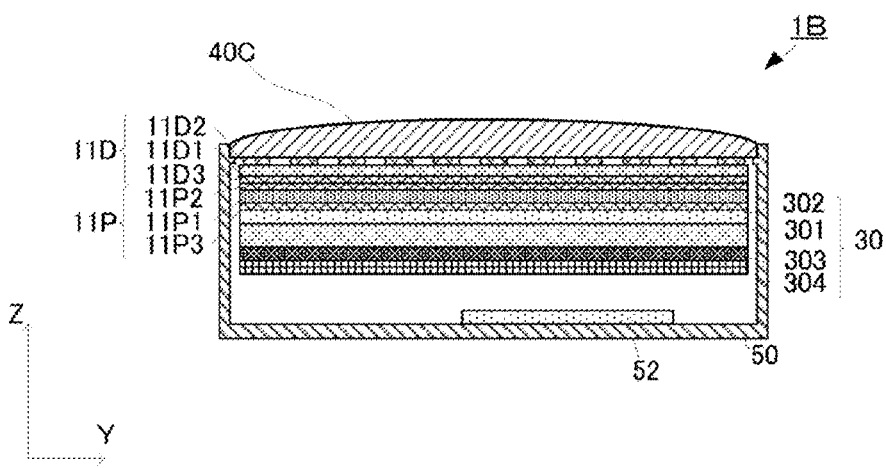
Figure 8C:
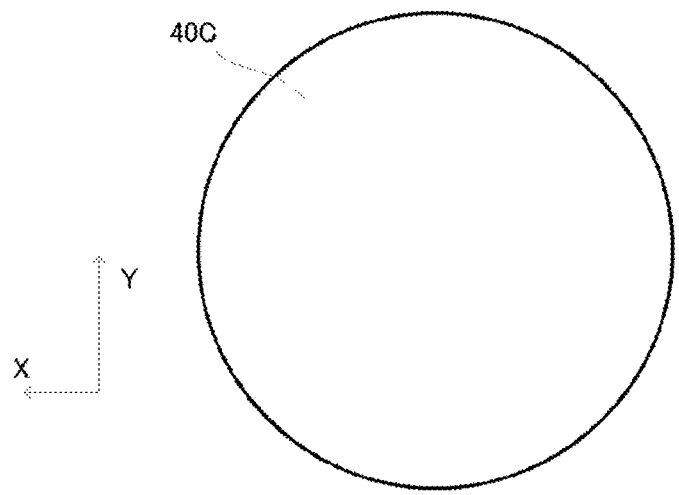

Next, FIGS. 8(A) to 8(C) are views illustrating a structure of a press detecting touch panel according to modified example 2. The components common to those of a press detecting touch panel 1 will be assigned the same reference numerals, and will not be described. FIG. 8(A) is a perspective view of a panel 40C, FIG. 8(B) is a sectional view (horizontal sectional view) of a press detecting touch panel 1B, and FIG. 8(C) is a plan view of the panel 40C.

The press detecting touch panel 1B according to modified example 2 includes the panel 40C whose shape seen from the plan view is circular instead of the panel 40. In this case, a shape of an opening of a housing 50 also has a circular shape when seen from the plan view. The shape of the housing 50 may be a thin cuboid shape or may be a thin columnar shape. Further, the panel 40C is not necessarily limited to the circular shape, and may have, for example, a regular octagonal shape or a polygonal shape. Furthermore, as illustrated in FIG. 7(A), the panel 40C may have a shape formed by pasting a plurality of panels.

The panel 40C is set on a base provided in an opening of the housing 50, and an entire periphery is fixed to the housing 50 by a double-sided tape. The panel 40C has a shape whose thickness changes along a Y direction (vertical direction) and whose thickness does not change along an X direction (horizontal direction).

Consequently, when a pressing operation is performed on the panel 40, a warp near the edge side in the horizontal direction is less than a warp near the edge side in the vertical direction. That is, also in this example, even when a center position is pressed, absolute values of potentials differ between near the edge side in the vertical direction at which positive potentials are produced and near the edge side in the horizontal direction at which negative potentials are produced, an area in which positive potentials are produced increases and an area in which negative potentials are produced decreases.

Hence, similar to the press detecting touch panel 1, the press detecting touch panel 1C including the panel 40C whose shape seen from the plan view is circular can detect a pressing operation and a pressing amount irrespectively of a pressing position.

Further, when, for example, the shape of the panel seen from the plan view is a rectangular shape, even when a center position is pressed, an entire output does not become zero yet there are portions at which reverse potentials are produced, and therefore the rectangular shape causes the same problem. Hence, the rectangular shape also provides a function and an effect provided according to the configuration of the present invention even when the panel having the non-uniform thickness is used or even when a plurality of panels of different aspect ratios is laminated.

Further, a press detecting touch panel including a capacitive sensor and a display unit has been described in the present embodiment. However, application examples of the press detecting touch panels according to the present invention are not limited to this. For example, a display unit 30 may be removed or a capacitive sensor may be removed.

DESCRIPTION OF REFERENCE SYMBOLS 1, 1A, 1C, 1B: PRESS DETECTING TOUCH PANEL
11P: PRESSING SENSOR
11P1: PIEZOELECTRIC FILM
11P2: PRESS DETECTION ELECTRODE
11P3: PRESS DETECTION ELECTRODE
30: DISPLAY UNIT
40, 40A, 40B, 40C: PANEL
50: HOUSING
52: CONTROL CIRCUIT MODULE

The invention claimed is:
1. A press detecting touch panel comprising:
a housing defining an opening;
a piezoelectric film; and
a holding member which holds the piezoelectric film within the opening, an entire periphery of the holding member being fixed to the housing such that the holding member covers the opening, a first cross sectional shape along a first direction of the holding member is different than a second cross sectional shape along a second direction of the holding member, the first direction and the second direction being orthogonal to each other, and a first curvature of a first main surface of the holding member is different from a second curvature of a second main surface of the holding member, the first main surface and the second main surface opposing each other, and each of the first main surface and the second main surface extending perpendicular to a stacking direction of the housing, the piezoelectric film and the holding member,
wherein, when the holding member is bent by a pressing force applied to the first main surface thereof, a warp in a horizontal direction is less than a warp in a vertical direction of the holding member.

2. The press detecting touch panel according to claim 1, wherein the piezoelectric film is made of a uniaxially stretched chiral polymer.

3. The press detecting touch panel according to claim 1, wherein the holding member has a non-uniform thickness.

4. The touch panel according to claim 1, wherein a thickness of the holding member changes along at least one of the first direction and the second direction.

5. The press detecting touch panel according to claim 1, wherein
the holding member comprises a plurality of laminated members, and
each of the plurality of laminated members has a different aspect ratio in a plan view of the press detecting touch panel.

6. The press detecting touch panel according to claim 5, wherein the plurality of laminated members include a first panel which is fixed to the housing and a second panel attached to the first panel, the second panel having a smaller area than the first panel in the plan view.

7. The press detecting touch panel according to claim 1, wherein a touch surface side of the holding member has a protrusion shape.

8. The press detecting touch panel according to claim 1, wherein the holding member has a square shape in a plan view of the press detecting touch panel.

9. The press detecting touch panel according to claim 1, wherein the holding member has a circular shape in a plan view of the press detecting touch panel.

10. A display device comprising:
the press detecting touch panel according to claim 1; and
a display unit within the housing.

* * * * *